J. W. JACKSON.
TIRE CARRIER.
APPLICATION FILED JAN. 9, 1917.
1,238,296.
Patented Aug. 28, 1917.
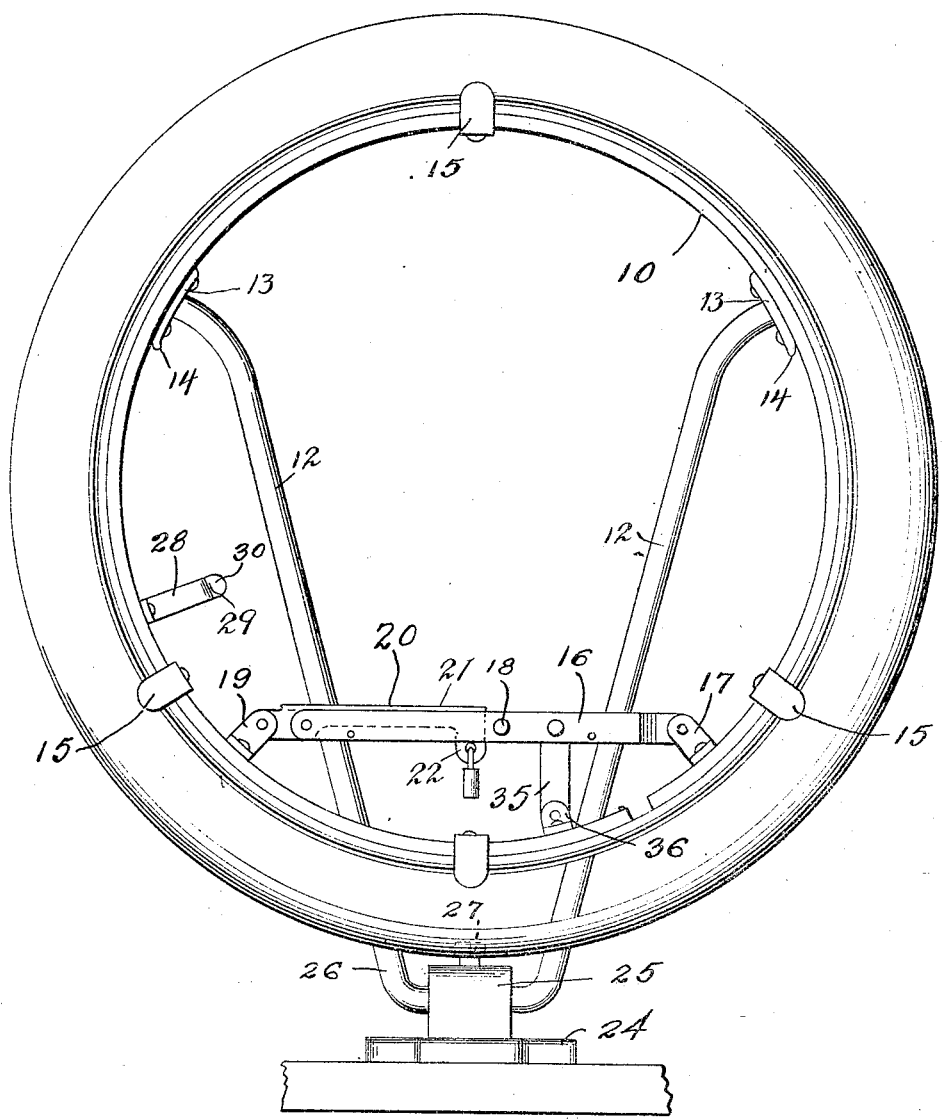
Witness
Chr. Nielsen, Jr.,
M. T. Belt
Inventor
Joseph W. Jackson
By H. L. Woodward
Attorney

UNITED STATES PATENT OFFICE.

JOSEPH W. JACKSON, OF ANDERSON, INDIANA, ASSIGNOR TO NEW ERA SPRING & SPECIALTY COMPANY, OF DETROIT, MICHIGAN, A CORPORATION OF MICHIGAN.

TIRE-CARRIER.

1,238,296.

Specification of Letters Patent.

Patented Aug. 28, 1917.

Application filed January 9, 1917. Serial No. 141,415.

*To all whom it may concern:*

Be it known that I, JOSEPH W. JACKSON, a citizen of the United States, residing at Anderson, in the county of Madison and State of Indiana, have invented certain new and useful Improvements in Tire-Carriers, of which the following is a specification.

This invention has for an object to give a simple construction of carrier for pneumatic or other tires, either when mounted upon a rim, or when demounted, which may be constructed at a low cost, and which will be highly efficient in use. It is an important aim to give a device adapted to be expanded within a rim or tire so as to hold it securely against removal when locked in expanded position. A further important aim is to cheapen the cost of the mounting and operative parts in an expanding device for this purpose. Another important aim is to simplify and cheapen the means for locking the device in expanded position. It is also a purpose to give a simple means for mounting the device upon a motor vehicle.

Additional objects, advantages and features of invention will appear from the construction, arrangement, and combination of parts hereinafter described and shown in the drawings, where—

The figure is an elevational view of a carrier constructed in accordance with my invention.

There is illustrated a tire supporting device including an expansible support in the form of a segment of a ring, and which will be termed for convenience a bracket rim 10. This rim is formed of resilient steel, preferably, and may be channeled, if desired. This channel section rim may be formed by rolling, as will be readily understood. The ends of the rim are preferably presented downwardly, and connected by an expanding and locking means presently to be described. Connected to the inner side of the rim there are terminal arms 12, of a supporting bracket, which may be of any desired form, adapted to be attached to a running board or to the body of a car, devices of this kind usually requiring several different forms to adapt them to the various types of cars. The ends of the arms 12 are provided with flattened plates 13, curved to conform to the curvature of the rim 10 throughout their major part, but at their lower ends having a slightly greater curvature, as at 14, so that when the device is in closed position the plates curve away from the inner surface of the rim, affording a relief whereby abrupt bending of the rim is obviated, and liability of breakage by fatigue is reduced. At any desired intervals on the rim, if necessary, clevises 15 may be provided, consisting of short straps of metal secured to the inner side of the band, with end portions extending outwardly in parallel relation at each side of the rim. The arms 12 may be slightly resilient, if desired to allow the arms to yield slightly when the lower ends of the rim 10 are borne toward each other.

An expanding and locking device is connected between the lower ends of the rim, consisting in the present instance of a main lever 16, formed of two light strips of sheet metal spaced apart throughout the major portion of their length, but lying in close contact at one end, which is pivoted between two ears 17 fastened to the inner side of the rim 10 at one end. A spacing bolt 18 may be engaged between the two parts of the lever 16 intermediately of its length.

On the opposite end of the rim 10 ears 19 similar to those 17 are mounted, between which there is pivoted a toggle lever 20, and the ends of the members of the levers 16 are also pivotally connected to this lever a distance outwardly from the ears 19 sufficiently to cause the necessary flexure of the rim 10 under movement of the lever 20 to permit the emplacement and removal of tires or rims upon the bracket rim 10. The lever 20 is formed of sheet metal L-shaped in cross section, the lateral flange 21 of which is adapted to rest upon the inner edges of the lever 16 when the lever 20 moves outwardly to its full limit. The lever 20 is also provided with an apertured ear 22, adapted to receive the shackle of a padlock, or any other locking device, the ear being of a sufficient length and so formed on the lever as to extend between the members of the lever 16 and project beyond the lower edges thereof, as shown.

While the particular manner in which the device is to be mounted upon a motor vehicle comprises no essential feature of the present invention, there is illustrated at 24 a cast bracket adapted to be secured to a vehicle body and having a transversely apertured lug 25 thereon, through which a rod 26 may be slidably and revolubly engaged, the ends of which rod may be extended to form the arms 12 before mentioned. By means of a set screw 27 the rod 26 may be held in various adjusted positions, as desired. In the production of this bracket, the rod 26 would be engaged through the lug 25 before being bent to form the arms 12.

It is not essential for the rim 10 to be formed with a channel throughout its length, and this feature may be omitted, especially in cases where but one tire is to be carried.

In order that the device will remain properly retracted when the lever is moved upwardly and outwardly to its full limit, a spring 28 is secured upon the rim 10 a distance above the pivot of the lever 20, this spring extending inwardly from the rim a distance and having a bill 29 projected in the path of the flange 21, and adapted to engage the underside of the flange to hold it against return at times. The spring is also formed with a backwardly turned tongue 30, serving as a strike by wihch the spring will be warded to one side by the lever as it is moved to open position, so that it will automatically engage with the lever, and this tongue will also serve as a finger piece to enable release of the spring. The rim 10 being normally under tension tending to resume its full expanded position, in order to cause the engagement of the device, it is only necessary to press the spring back, so that initial movement of the device for securement of a tire will be facilitated and expedited.

The rim 10 is constructed so that the opposed ends are spaced apart a very short distance, so that practically a continuous ring is presented upon which an empty tire shoe may be satisfactorily mounted, if desired, the device being made of a proper size for the purpose. The device in this form is preferably mounted with the gap in the ring located to one side of the vertical center of the device, and ears 17 are secured immediately adjacent the extremity of the rim at the upper side of this gap, between which a lever 16 is pivoted. A link 35 is pivoted therebetween a short distance from the base of the lever, and connected to the extremity of the rim at the lower side of the gap or closely thereadjacent, being pivoted between ears 36, similar to those 17, secured upon the inner face of the rim.

What is claimed:

A device of the character described comprising a resilient bracket rim in the form of the segment of a ring having closely spaced ends, a lever pivoted near one end of the rim, a second lever pivoted on the opposite end portion of the rim a considerable distance from its extremity, said levers being pivotally connected closely adjacent the connection of the second lever and rim, the second lever being extended beyond its connection with the first lever, and a link connected between the extreme end of the rim opposite the first lever, and the first lever, and means to hold the second lever at either limit of its movement.

In testimony whereof I have affixed my signature in presence of two witnesses.

JOSEPH W. JACKSON.

Witnesses:
   JACK BRUNT,
   GEORGE P. KARST.